(12) United States Patent
Ting

(10) Patent No.: US 7,566,241 B2
(45) Date of Patent: Jul. 28, 2009

(54) STACKED CARD CONNECTOR

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/215,247

(22) Filed: Jun. 25, 2008

(65) Prior Publication Data

US 2009/0004919 A1 Jan. 1, 2009

(30) Foreign Application Priority Data

Jun. 25, 2007 (TW) .............................. 96210272 U

(51) Int. Cl.
*H01R 13/60* (2006.01)
(52) U.S. Cl. ................................................. 439/541.5
(58) Field of Classification Search .............. 439/541.5, 439/79, 630, 607
See application file for complete search history.

(56) References Cited

U.S. PATENT DOCUMENTS

| 7,063,539 | B2 | 6/2006 | Ho |
| 7,086,906 | B1 | 8/2006 | Ting |
| 7,338,307 | B2* | 3/2008 | Zhang et al. ................. 439/326 |
| 2001/0029127 | A1* | 10/2001 | Higuchi .................... 439/541.5 |
| 2004/0023553 | A1* | 2/2004 | Lee .......................... 439/541.5 |

* cited by examiner

*Primary Examiner*—Hien Vu
(74) *Attorney, Agent, or Firm*—Wei Te Chung

(57) ABSTRACT

A stacked card connector (100) includes a first electrical card connector (1), a second electrical card connector (2) under the first electrical card connector, and a converting mechanism (5) on the second electrical card connector having a pair of opposite surfaces (431, 432) in a card inserting direction. The first card connector comprises a first insulating housing (12) received a plurality of first terminals (13) and a first ejecting mechanism (61) and a second ejecting mechanism (62) arranged side by side. The second card connector (2) includes a second insulating housing (23) received a plurality of second terminals (24). The first and the second terminals extend into corresponding surfaces of the converting mechanism.

11 Claims, 6 Drawing Sheets

STACKED CARD CONNECTOR

BACKGROUND OF THE INVENTION

1. Field of the Invention

The present invention relates to a card connector to be used in a personal computer or the like for connecting and disconnecting a card to the personal computer. Here, the card generally refers to a memory card such as personal computer (PC) card or the like.

2. Description of Prior Arts

Modern times, the PC card is always used as an external equipment for increase the storage of the electrical consumer products, like Mobile phone, Digital camera, etc. The electrical card connector is used for electrically connecting the PC card and the electrical consumer products. Specially, a card connector is disclosed by the prior art, which comprises a plurality of card connectors stacked with each other to save the space of the electrical products. Meantime, for improving the quality of signals transmitting, some of stacked card connector use an electrical converting plate to electrical connect with a printed circuit board (PCB).

Said stacked card connector comprises different terminals mating with corresponding holes of the converting plate, and the converting plate is soldered to corresponding circuit on the PCB. However, during assembly, the terminals should be inserted into the holes of the converting plate exactly. Considering the size of the card connector and the converting, the process of inserting is very difficult and easily mismating.

Therefore, we need an improved stacked card connector to solve these problems.

SUMMARY OF THE INVENTION

An object, therefore, of the invention is to provide a stacked card connector, which is easily mating with a converting plate.

In the exemplary embodiment of the invention, a stacked card connector includes a first electrical card connector, a second electrical card connector under the first electrical card connector, and a converting mechanism on the second electrical card connector having a pair of opposite surfaces in a card inserting direction. The first card connector comprises a first insulating housing received a plurality of first terminals and a first ejecting mechanism and a second ejecting mechanism arranged side by side. The second card connector includes a second insulating housing received a plurality of second terminals. The first and the second terminals extend into corresponding surfaces of the converting mechanism.

Other objects, advantages and novel features of the invention will become more apparent from the following detailed description of the present embodiment when taken in conjunction with the accompanying drawings.

DETAILED DESCRIPTION OF THE PREFERRED EMBODIMENT

An embodiment of the present invention will be described with reference to FIG. 1 through FIG. 6.

Figure 1:
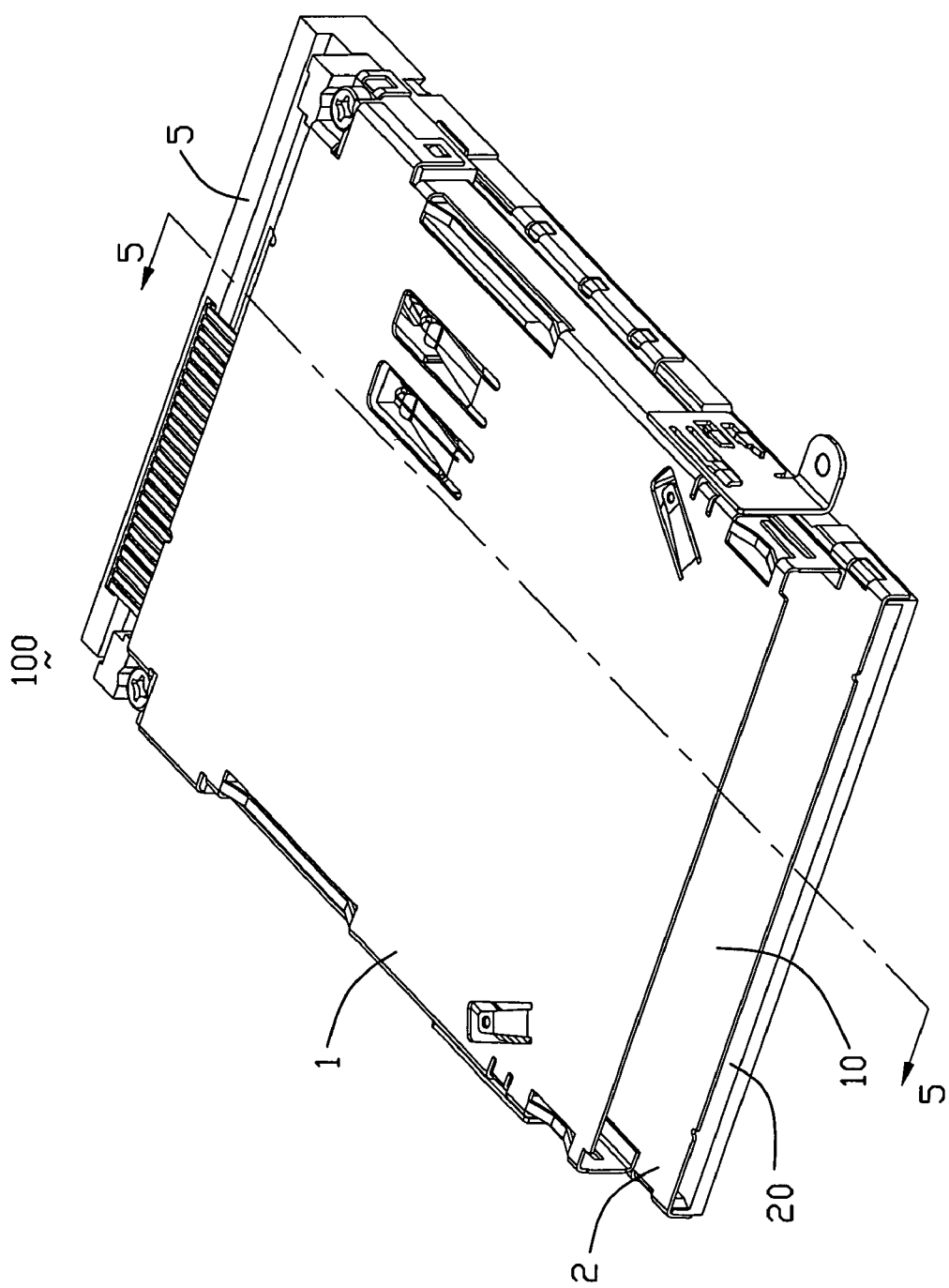
FIG. 1 is a perspective view of a stacked card connector of present invention.

In FIG. 1, a stacked card connector 100 of present invention comprises a first connector 1, a second connector 2 mounted under the first connector 1, and a converting mechanism 5 on the second connector 2. The converting mechanism 5 comprises a converting plate 3 mating with the first and the second connector 1, 2 and a retaining member 4.

Figure 2:
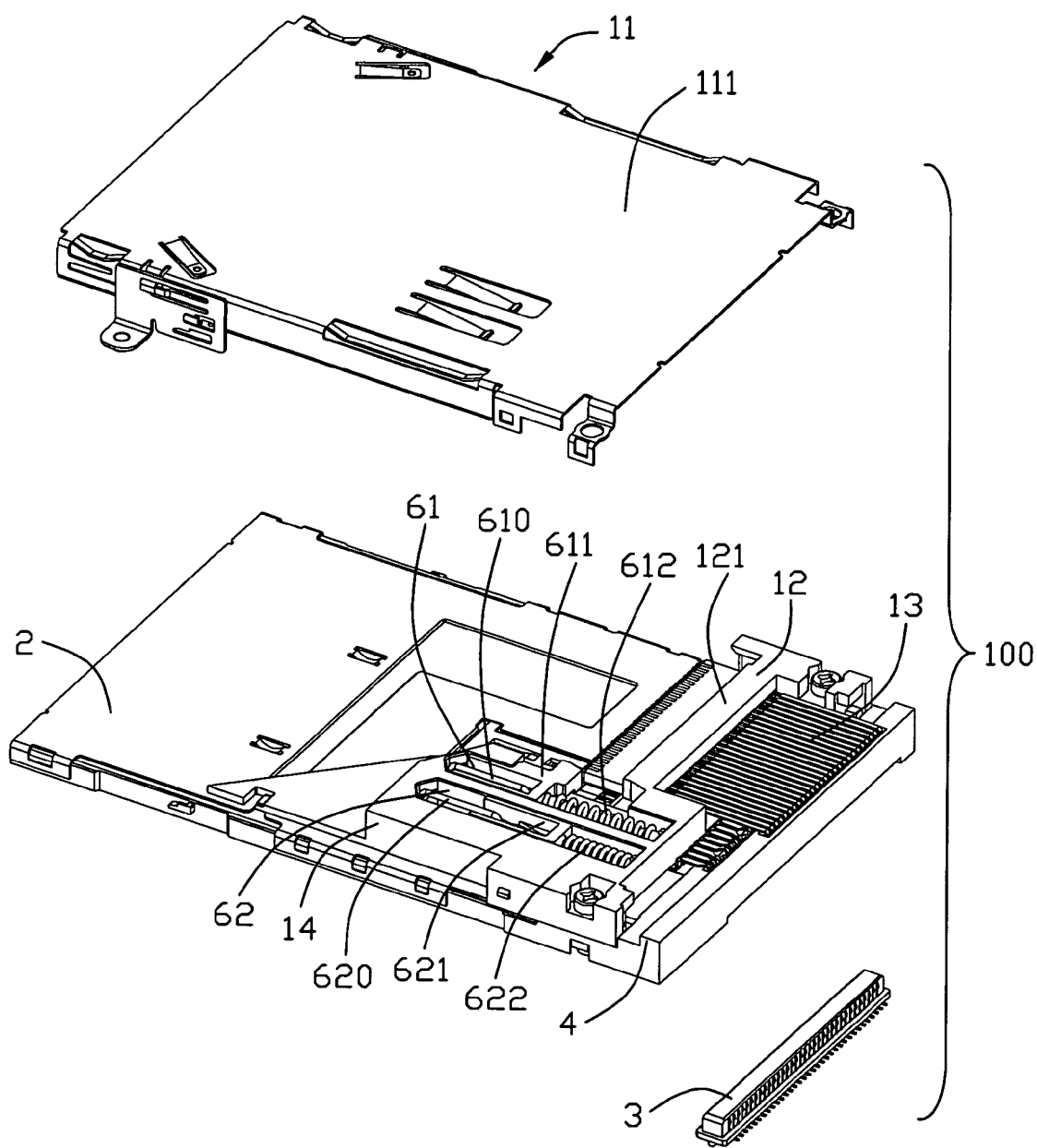
FIG. 2 is a partially exploded view of the stacked card connector of present invention as shown in FIG. 1.

Referring to FIG. 1 to FIG. 2, the first connector 1 is formed in an approximately longitudinal shape, and comprises a first shell 11 in a rectangular shape, and a first insulating housing 12 receiving a plurality of first terminals 13. The first shell 11 defining a first receiving space 10 and a first opening (not labeled) for card inserting, comprises a body plate 111 and a pair of side walls 112 extending downwardly from the body plate 111. The first insulating housing 12 comprises longitudinal base 121 and a base seat 14 extending from an end of the base 121. The first shell 11 connecting with the base 121 of the first insulating housing 12 opposite to the opening. The base seat 14 comprises a triangular guiding block and two channels 120, 130 defined side by side thereon. The first terminals 13 partially received in the base 121, comprises a horizontal portion 131 and a vertical portion extending downwardly from an end of the horizontal portion 131. The horizontal portion 131 is retained in the base 121 of the first insulating housing 12. The distance between two adjacent vertical portion 132 is certain and we defines this distance as the distance A.

The second connector 2 comprises a second insulating housing 23, a second shell 21 covering on the second insulating housing 22 and a second terminal module 23 with a plurality of terminals 24 received in the second insulating housing 22. The second shell 21 defines a second receiving space 20 adaptor for receiving a second card. Each second terminal 24 comprises a contacting portion (not labeled), a vertical tail portion 242 beyond the second insulating housing 22 and a horizontally portion 241 connecting the contacting portion and the tail portion 242. The tail portion 242 vertically extends from an end of the connecting portion 241. Similarly, the distance between the two adjacent tail portions 242 of the second terminals 24 is certain and we defines this distance as the distance B. The distance A is equal with the distance B.

Figure 3:
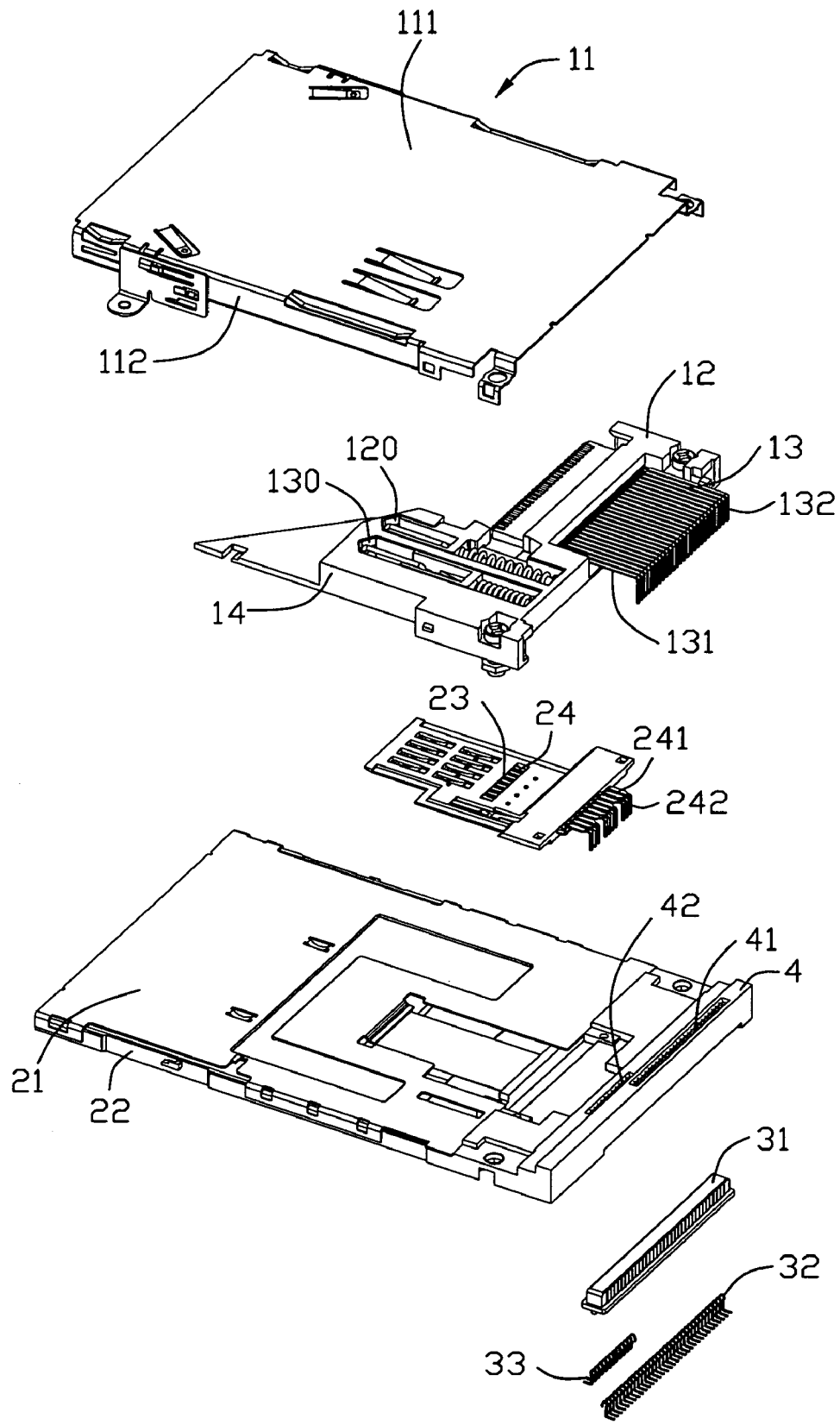
FIG. 3 is an exploded view of the stacked card connector of present invention as shown in FIG. 1.
Figure 4:
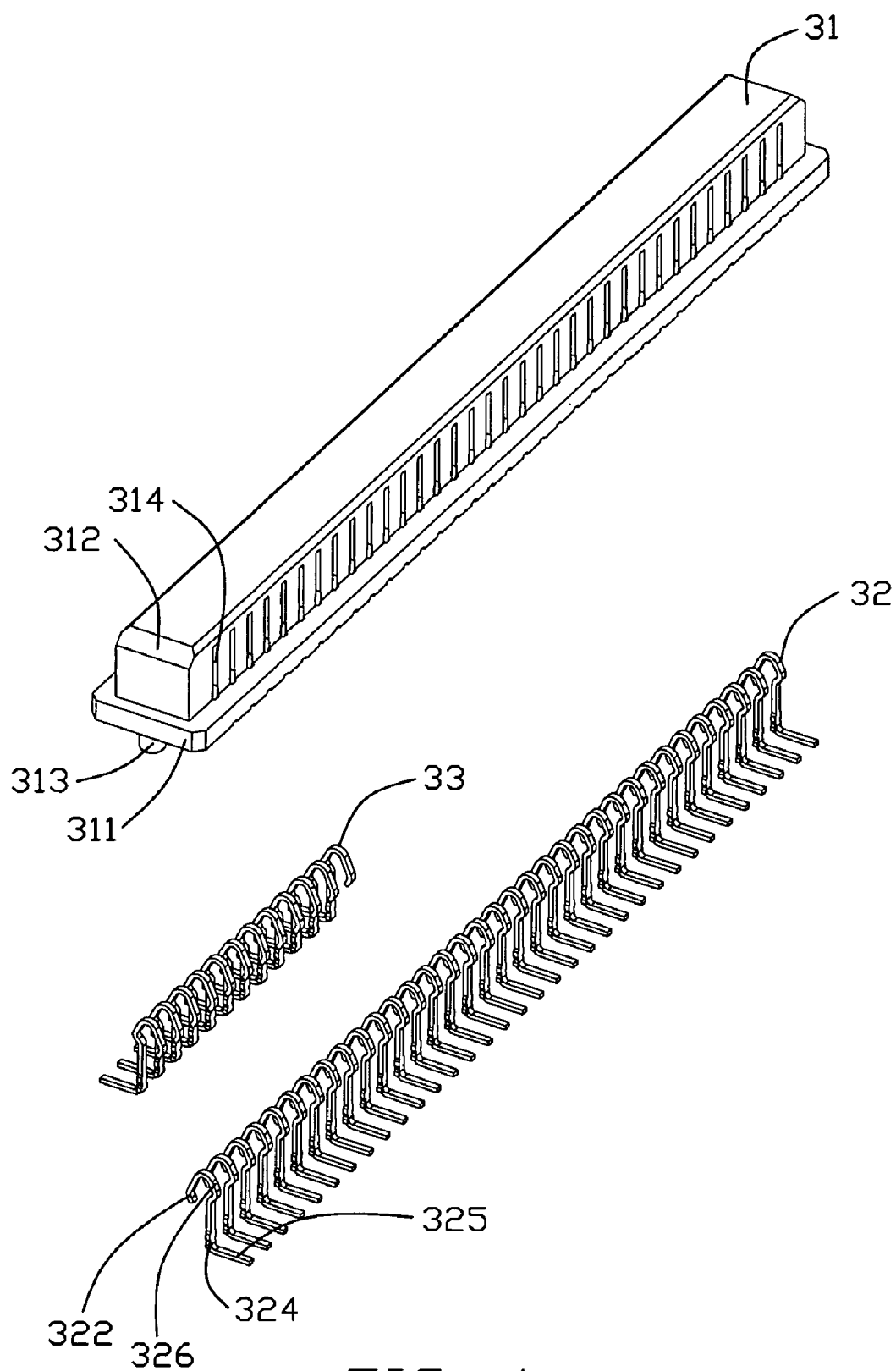
FIG. 4 is an exploded view of a converting plate of the stacked card connector of present invention as shown in FIG. 1.
Figure 5:
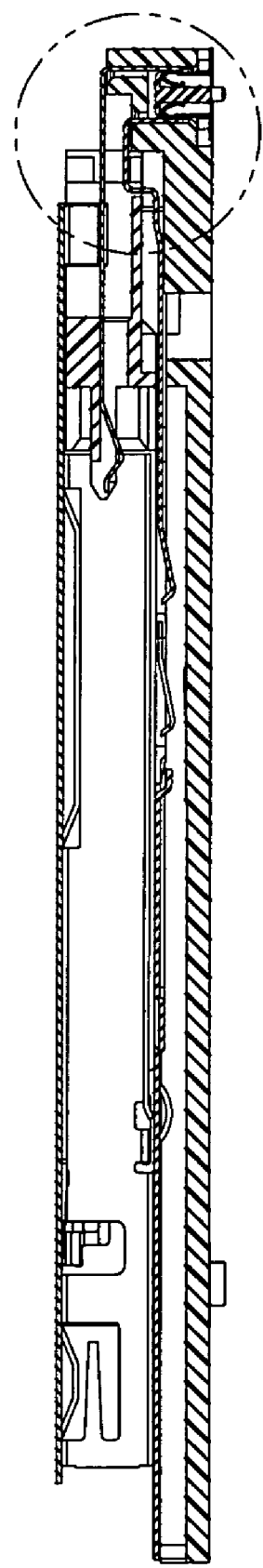
FIG. 5 is a cross-section view along the line 5-5 in the FIG. 1 of the stacked card connector of present invention as shown in FIG. 1.
Figure 6:
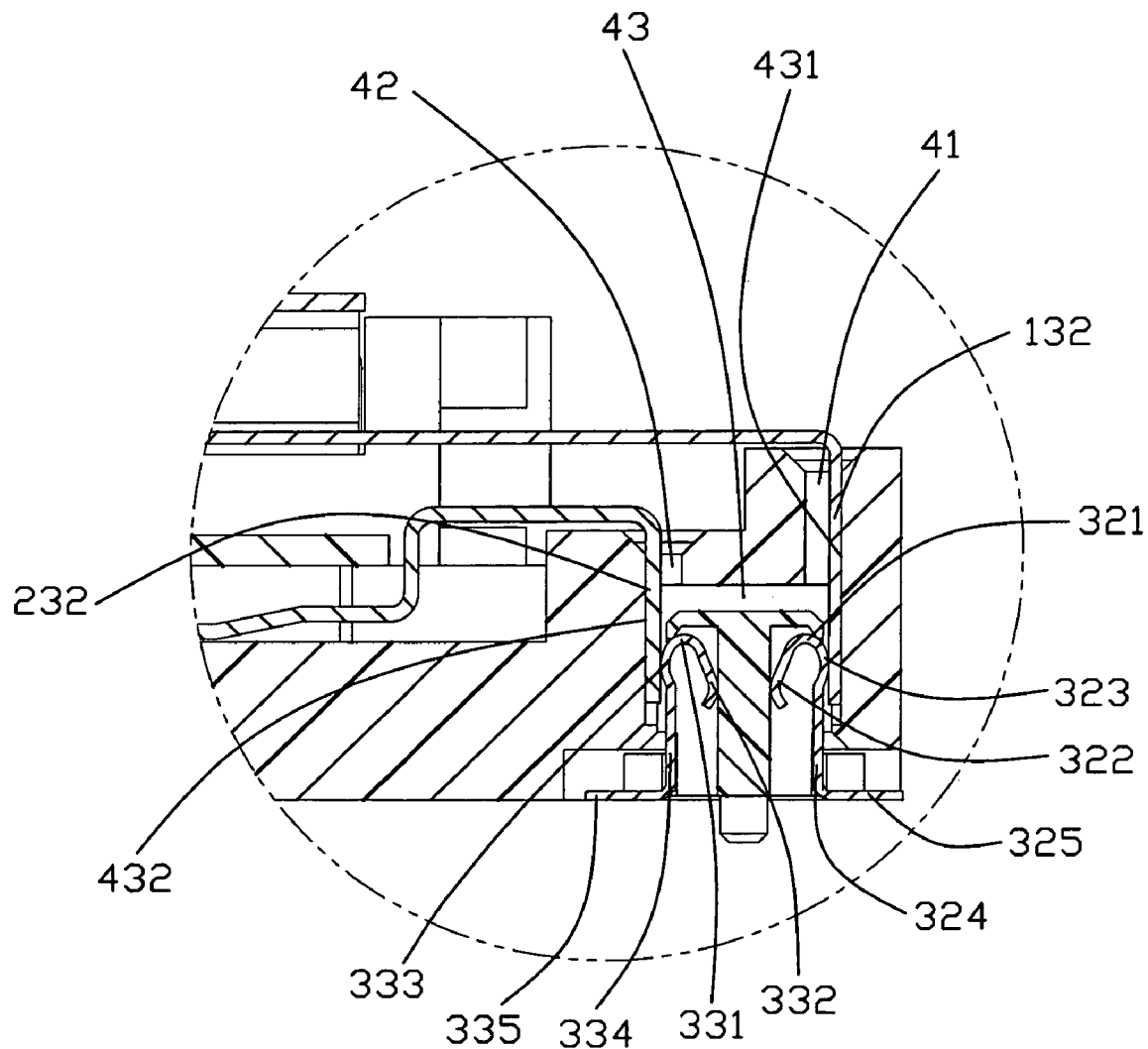
FIG. 6 is an enlarged view of the part labeled in FIG. 5.

As shown in FIG. 2, FIG. 3 and FIG. 6, the second insulating housing 22 forms a retaining member 4 at an end thereof. The retaining member 4 defines a plurality of first vertical slots 41 and a plurality of second vertical slots 42, both of them are arranged in a line in a lateral direction. The retaining member 4 is configured of a step. The first vertical slots 41 are located on a higher step of the retaining member 4 and the second vertical slots 42 are located on a lower step of the retaining member 4. The retaining member 4 further comprises a receiving cavity 43 communicating with the first and second slots 41, 42 at the bottom surface of the retaining member 4. The first vertical slots 41 and the second vertical slots 42 are provided for corresponding first terminals 13 and the second terminals 24 passing through. The converting plate 3 is received in the receiving cavity 43. In this embodiment, the retaining member 4 is integral with the second insulating housing 22. The retaining member 4 comprises a front inside surface 431 communicating with the first vertical slots 41 and a rear inside surface 432 communicating with the second vertical slots 42. The vertical portion 132 of the first terminal 13 and the tail portion 242 of the second terminal 24, respectively, pass through first slot 41 and the second slot 42 into the front inside surface 431 and the rear inside surface 432. Certainly, the retaining member 4 is capable of separating from the second insulating housing 22.

Referring to FIG. 3-FIG. 6, the longitudinal converting plate 3 comprises a longitudinal body 31, a plurality of third terminals 32. The body 31 comprises a main portion 311, a receiving portion 312 extending upwardly from the main portion 311 and a positioning portion 313 extending downwardly from the main portion 311 to positioning the converting plate 3 on a printed circuit board (PCB). The receiving portion 312 defines a plurality of terminal cavities 314 at opposite sides thereof arranged in the lateral direction for receiving the third terminals 32. Each terminal cavity 314 defines a vertical cutout at the lateral surface of the receiving portion 312. Each third terminal 32 comprises a vertically extending retaining part 324, a resilient and curved contacting part 326 bent from the top end of the retaining part 324, a soldering part 325 extending horizontally from the bottom end of the retaining part 324. Each curved contacting part 326 forms free end 322. The third terminals 32 are assembled into corresponding terminal cavities 314 in an up-to-down direction. The retaining parts 324 are retained in the terminal cavities 314, the free ends 322 of the contacting parts 326 are received in the terminal cavities 314 and face to the inside of the terminal cavities 314, the contacting parts 326 are partially beyond the lateral surface of the receiving portion 312 and the soldering parts 325 are beyond the bottom surface of the main portion 311. The converting plate 3 mates with the retaining member 4 with the receiving portion 31 received in the receiving cavities. Correspondingly, the contacting parts 326 of the third terminals 32 electrically connecting with the vertical portion 132 of the first terminals 13 at the front inside surface 431 and the tail portions 242 of the second terminals 24 at the rear inside surface 432.

Two ejecting mechanisms 61, 62, respectively, received in corresponding channels 120, 130 of the base seat 14, each comprises a sliding pole 610, 612, a slider 611, 621, and a spring member 612, 622. The ejecting mechanism 61, 62 is a type of PUSH-PUSH, and the working process has been disclosed in many prior arts.

In this embodiment, the first card is a type of Express card, and the second card is a Smart card.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A stacked card connector, comprising:
   a first electrical card connector comprising a first insulating housing received a plurality of first terminals and a first ejecting mechanism and a second ejecting mechanism arranged side by side;
   a second electrical card connector under the first electrical card connector comprising a second insulating housing received a plurality of second terminals; and
   a converting mechanism on the second electrical card connector having a pair of opposite walls in a card inserting direction; wherein
   the first and the second terminals extend into corresponding walls of the converting mechanism;
   wherein the converting mechanism comprises a retaining member on the second insulating housing and a converting plate received in the retaining member;
   wherein the retaining member defines a plurality of first vertical slots communicating with a front inside surface thereof and a plurality of second vertical slots communicating with a rear inside surface thereof;
   wherein the retaining member comprises a receiving cavity, said converting plate partially received in the receiving cavity, the front inside surface and the rear inside surface are the inside surfaces of the receiving cavity;
   wherein the converting plate comprises a main portion, a receiving portion extending from the main portion and a plurality of third terminals located at the opposite lateral surfaces of the receiving portion and engaged with the first and second terminals, said receiving portion is received in the receiving cavity of the retaining member with two opposite surfaces thereof facing to the front inside surface and the rear inside surface, respectively;
   wherein the third terminal comprises a retaining part retaining in the receiving portion, a soldering part extending from an end of the retaining part and a contacting part extending from the other end of the retaining part opposite to the soldering part and partially beyond the lateral surfaces of the receiving portion;
   wherein the first insulating housing comprises a base and a base seat extending from the base, the base seat defines two channels side by side, said first and second ejecting mechanisms are, respectively, received in the channels.

2. The stacked card connector as claimed in claim 1, wherein the retaining member is configured of a step, the first vertical slots are located at a higher step, and the second vertical slots are located at a lower step.

3. The stacked card connector as claimed in claim 2, wherein the first terminals pass through the first vertical slots to the front inside surface of the retaining member, the second terminals pass through the second vertical slot to the front inside surface.

4. The stacked electrical card connector as claimed in claim 1, wherein the contacting parts of the third terminals, respectively, electrically connect with the first and the second terminals.

5. The stacked electrical card connector as claimed in claim 1, wherein the first card connector comprises a first shell covering on the first insulating housing, the first shell defines a first receiving space.

6. The stacked card connector as claimed in claim 5, wherein the first insulating housing forms a triangular guiding block in the first receiving space.

7. The stacked card connector as claimed in claim 1, wherein the second card connector comprises a terminal module received in the second insulating housing, and wherein said second terminals are partially received in the terminal module.

8. The stacked card connector as claimed in claim 1, wherein the first terminal comprises a vertical part mating with the converting mechanism, the second terminal comprises a tail portion mating with the converting mechanism.

9. The stacked card connector as claimed in claim 8, wherein the distance between two adjacent vertical parts of the first terminals is equal with that of two adjacent tail portions of the second terminals.

10. A stacked card connector comprising:

an upper electrical card connector at an upper level, comprising an upper insulative housing with a plurality of upper terminals therein and defining an upper card receiving space into which the upper terminals extend;

a lower electrical card connector comprising a lower insulative housing with a plurality of lower terminals therein and defining a lower card receiving space, at a lower level, into which the lower terminals extend; and a converting mechanism being essentially located at the lower level, located at a rear end of the lower connector; wherein the upper terminals essentially extend downward into the converting mechanism while the lower terminals essentially extend initially upward and successively downwardly into the converting mechanism;

wherein a plurality of contacts are disposed in the converting mechanism and respectively engaged with the corresponding upper and lower terminals;

wherein the upper terminals extend on one side of the converting mechanism while the lower terminals extend on the other side of the converting mechanism;

wherein the converting mechanism comprises a retaining member on the low insulating housing and a converting plate received in the retaining member;

wherein the converting plate comprises a main portion, a receiving portion extending from the main portion and the plurality of low terminals located at the opposite lateral surfaces of the receiving portion and engaged with the upper terminals, said receiving portion is received in the receiving cavity of the retaining member with two opposite surfaces thereof facing to a front inside surface and a rear inside surface, respectively; and wherein a pair of ejection mechanisms are commonly disposed in the upper housing while being equipped with the ejecting tabs extending into the respective upper and lower card receiving space.

11. The stacked card connector as claimed in claim 10, wherein the converting mechanism is embedded within the lower housing.

* * * * *